(12) United States Patent
Weber (10) Patent No.: US 6,586,895 B2
(45) Date of Patent: Jul. 1, 2003

(54) RASTER DISTORTION CORRECTION CIRCUIT

(75) Inventor: Rudolf Weber, Meilen (CH)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 10/125,737

(22) Filed: Apr. 18, 2002

(65) Prior Publication Data

US 2002/0167285 A1 Nov. 14, 2002

Related U.S. Application Data (60) Provisional application No. 60/289,417, filed on May 8, 2001.

(51) Int. Cl.[7] .............................................. H05B 29/56
(52) U.S. Cl. ....................................... 315/370; 315/408
(58) Field of Search ................................... 315/370, 408

(56) References Cited

U.S. PATENT DOCUMENTS

| | | | |
|---|---|---|---|
| 4,234,826 A | * | 11/1980 | Dietz .......................... 315/393 |
| 4,533,855 A | | 8/1985 | Willis et al. |
| 4,563,618 A | | 1/1986 | Haferl |
| 4,634,937 A | | 1/1987 | Haferl |
| 4,780,648 A | | 10/1988 | Haferl |
| 4,906,902 A | | 3/1990 | Haferl |
| 5,661,375 A | | 8/1997 | Haferl |
| 5,949,201 A | | 9/1999 | Suzuki et al. |
| 6,124,686 A | | 9/2000 | Kikuchi et al. |
| 6,222,328 B1 | | 4/2001 | Kikuchi et al. |

* cited by examiner

*Primary Examiner*—David Vu
(74) *Attorney, Agent, or Firm*—Joseph S. Tripoli; Harvey D. Fried; Sammy S. Henig (57) ABSTRACT

A horizontal deflection circuit includes a horizontal deflection winding coupled to a retrace capacitor to form a retrace resonant circuit. An S-shaping capacitor is coupled to the deflection winding to form a first trace resonant circuit. A first switching transistor is responsive to a synchronizing first signal at a frequency related to a horizontal deflection frequency and coupled to the deflection winding for generating a deflection current in the deflection winding. A second switching transistor is responsive to the first signal and having first and second switching state, during first and second portions of the trace interval. The second switching transistor couples the S-shaping capacitor to a modulation inductance and to a modulation capacitor to form a second trace resonant circuit, during the second portion of the trace interval. The length of the second portion is modulated at a vertical rate parabolic manner for modulating a current in the S-shaping capacitor to provide modulated S correction.

15 Claims, 6 Drawing Sheets

RASTER DISTORTION CORRECTION CIRCUIT

CROSS REFERENCE TO RELATED APPLICATIONS

This is a non-provisional application, which claims the benefit of provisional application Ser. No. 60/289,417, filed May 8, 2001.

BACKGROUND OF THE INVENTION

The invention relates to a horizontal deflection circuit for a cathode ray tube (CRT) that provides raster distortion correction, for example, inside pincushion or inside barrel raster distortion correction.

Horizontal deflection circuits commonly employ resonant trace and retrace principles. During retrace, the deflection circuit forms a high frequency parallel resonant circuit for storing energy in the deflection circuit from the flyback transformer primary winding. The retrace provides a fast return of the deflection current.

During the trace interval, a deflection switch provides a low frequency trace resonant circuit having a trace resonant frequency and formed by the deflection winding and the S-shaping capacitor. As a result, energy circulates from the yoke to the S-capacitor and back to the yoke in one trace period. The resonant circuit that includes the deflection winding and the S-capacitor produces a sinewave shaped component of the deflection current at the trace resonant frequency.

The value of the S-capacitor determines the S-shaping of the deflection current. Thus, the S-capacitor is selected for improving horizontal linearity. The voltage across the S-capacitor is cosine shaped. The amplitude is highest at the center of trace, when the deflection current is zero.

The correction of inner raster distortion requires modulation of the S-shaping as a function of the distance along the vertical axis of the raster display, i.e. from top to the center and from the center to the bottom of the raster. This is achieved by modulating the peak-to-peak amplitude of the component of the voltage across the S-capacitor that varies at the horizontal rate. The modulated voltage appears also across the horizontal deflection winding and causes a modulation of the deflection current. CRTs with deflection angles larger than 110 degree require the trace resonant frequency to vary, in accordance with the vertical position of the electron beam of the CRT, for providing either inside pincushion or inside barrel distortion correction.

In carrying out an inventive feature, an adjustable raster correction is accomplished by coupling an inductor-capacitor (LC)-network during a portion of the trace interval to the S-capacitor via a controllable switching transistor. The LC-network forms a second trace resonant circuit. The current shape in the second trace resonant circuit is approximately sinusoidal with a period equals to the conduction time of the controllable switching transistor. By controlling the conduction time of the controllable switching transistor, the frequency and the magnitude of the current in the LC-network is selected. The resulting deflection current shape is the sum of the controlled, approximately sinusoidal current in the LC-network and the current in the S-capacitor.

SUMMARY OF THE INVENTION

A deflection apparatus embodying an aspect, includes a deflection winding coupled to a retrace capacitance to form a retrace resonant circuit during a retrace interval, and coupled to a trace capacitor to form a first trace resonant circuit that includes the deflection winding and the trace capacitor during a trace interval. A first switching semiconductor is responsive to a synchronizing first signal at a frequency related to a first deflection frequency and coupled to the deflection winding for generating a deflection current in the deflection winding synchronized to the synchronizing signal. A modulation inductance is coupled in a second trace resonant circuit during the trace interval. A source of a modulation second signal at a frequency related to a second deflection frequency is provided. A second switching semiconductor is responsive to the first and second signals, having a first switching state during a first portion of the trace interval and a second switching state during a second portion of the trace interval. The first and second portions vary in accordance with the second signal. The second switching semiconductor is coupled to the modulation inductance for producing in the modulation inductance and in the trace capacitor a modulation current that modulates a voltage developed in the trace capacitor in accordance with the second signal for providing raster distortion correction.

DESCRIPTION OF THE PREFERRED EMBODIMENTS

Figure 1:
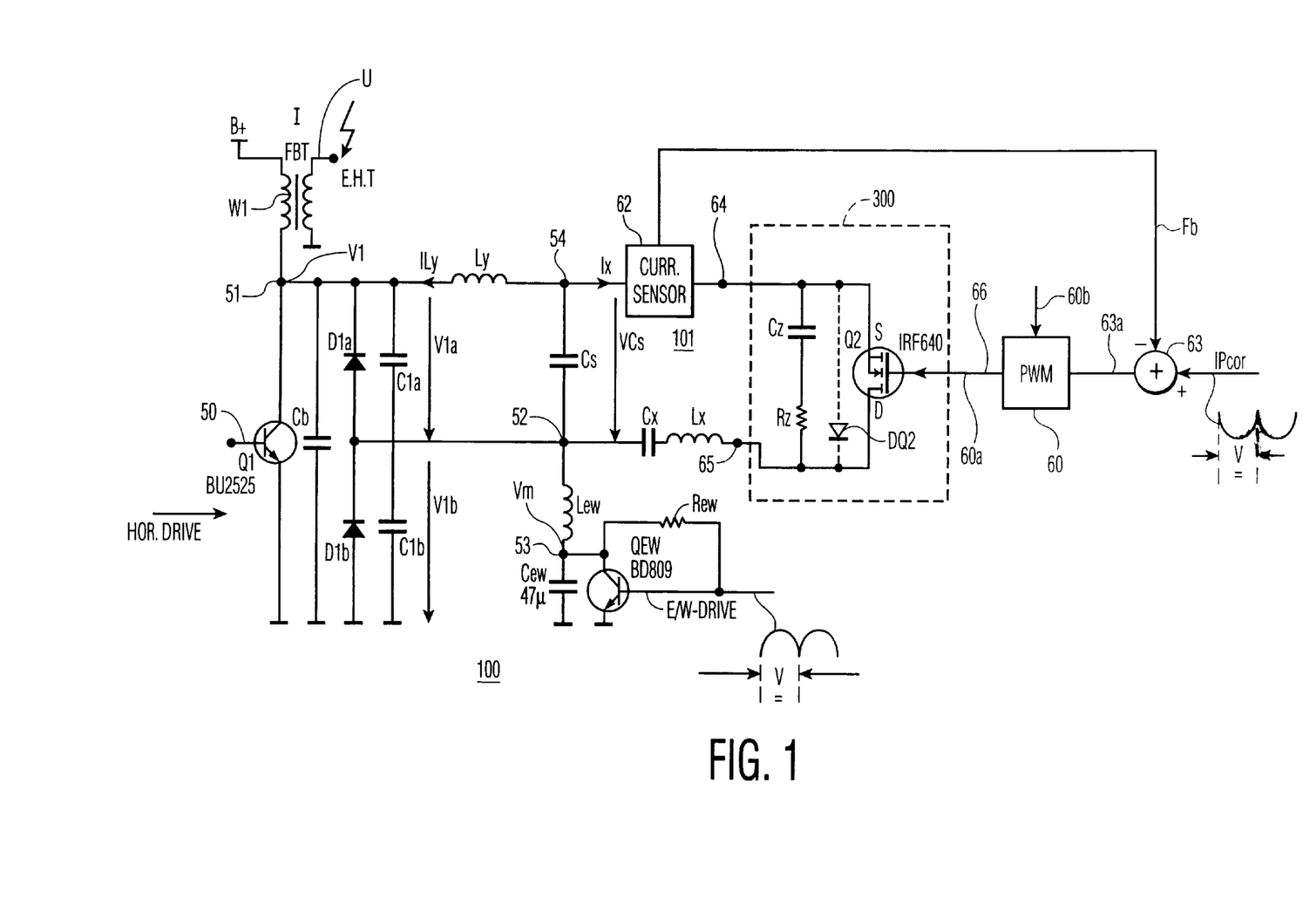
FIG. 1 illustrates a simplified schematic diagram of a deflection circuit, embodying an inventive feature.

FIG. 1 illustrates a simplified schematic diagram of a deflection circuit 100, embodying an inventive feature. Deflection circuit 100 operates at a horizontal frequency of, for example, 31.5 kHz. Deflection circuit 100 includes a primary winding W1 coupled to a source of a constant direct current (DC) supply voltage B+. Winding W1 of a conventional flyback transformer T is also coupled to a collector terminal 51 of a horizontal output or switching transistor Q1. The base of a transistor Q1 is controlled by a horizontal drive signal 50 having approximately 50% duty cycle. An emitter voltage of transistor Q1 is at a common conductor potential, or ground. A first retrace capacitor Cb is coupled to a collector terminal 51 of transistor Q1. Terminal 51 is also coupled to a second retrace capacitor C1a.

A terminal 52 of capacitor C1a is coupled via a series coupled third retrace capacitor C1b to ground. A damper diode D1a is coupled in parallel with capacitor C1a. A damper diode D1b is coupled in parallel with capacitor C1b. Terminal 52 is coupled to an East-West modulation inductor Lew. Inductor Lew has a terminal 53 that is coupled to a collector of an East-West modulation transistor Qew and to a filter capacitor Cew to form a conventional diode modulator that provides outside pincushion distortion correction.

Transistor Qew is controlled in a conventional manner by a vertical rate parabolic modulation signal E/W-DRIVE having a period V that provides East-West raster distortion correction. The term V denotes the vertical period in the television standard, such as for example, 20 millisecond. A feedback resistor Rew is coupled between the collector and base of transistor Qew to provide class A operation. Consequently, a vertical rate parabolic modulation voltage Vm is developed at terminal 53 of inductor Lew, in a conventional manner. A deflection winding Ly is coupled between terminal 51 and a terminal 54. A conventional S-shaping capacitor Cs is coupled between terminals 52 and 54.

During the first half of horizontal trace, diodes D1$a$ and D1$b$ are conductive and magnetic energy is stored in winding W1, in a conventional manner. Also, a deflection current ILy flows in diodes D1$a$ and D1$b$. During the second half of horizontal trace, transistor Q1 is conductive and deflection current ILy flows in transistor Q1. At the end of trace, transistor Q1 is turned off, a retrace pulse voltage V1$a$ is developed in capacitor C1$a$ and a retrace pulse voltage V1$b$ is developed in capacitor C1$b$, in a conventional manner.

An actively controlled trace resonant circuit 101, embodying an inventive feature, is coupled between terminals 52 and 54 and in parallel with S-capacitor Cs. Trace resonant circuit 101 includes a series arrangement of an inductor Lx, a capacitor Cx and a controllable switching arrangement 300. A pulse-width modulator (PWM) 60 produces a phase modulated signal 60$a$ at a control terminal 66 of controllable switching arrangement 300. Signal 60$a$ controls switching timings in controllable switching arrangement 300, in accordance with a difference between an input signal IPcor and a feedback signal Fb, produce by current sensor 62. Signal IPcor is a vertical rate correction waveform for correcting, for example, inside pincushion distortion. Signal Fb is indicative of an amplitude of a current Ix in controlled trace resonant circuit 101 and is subtracted from input signal IPcor in a circuit 63 to produce a difference signal 63$a$ that controlls PWM 60. An additional timing signal 60$b$ is coupled to PWM 60 for synchronization purposes. Feedback signal Fb improves linearity of operation when large corrections are required.

In a first circuit configuration and mode of operation of actively controlled trace resonant circuit 101, the selected value of capacitor Cx of FIG. 1 is 330 nF, that of inductor Lx is 150 uH, that of capacitor Cz is 680 pF and that of resistor Rz is 820 Ohm. Controllable switching arrangement 300 includes a transistor Q2. Transistor Q2 is a metal oxide semiconductor (MOS) transistor having a source current conducting terminal 64 coupled to terminal 54 of capacitor Cs via a low impedance path of a current sensor 62. A drain current conducting terminal 65 of switching transistor Q2 is coupled to terminal 52 of capacitor Cs via inductor Lx and capacitor Cx. A capacitor Cz is coupled in series with a resistor Rz to form a series arrangement that is coupled between terminals 64 and 65 of switching transistor Q2 for eliminating switching related transients. Capacitor Cz and resistor Rz might be required because of the remaining reverse recovery time in an internal diode DQ2 formed in the wafer that includes MOS transistor Q2 and produced together with transistor Q2. Instead of current sensor 62, a voltage sensor, not shown, that is coupled across transistor Q2 may be used.

Figure 3A:
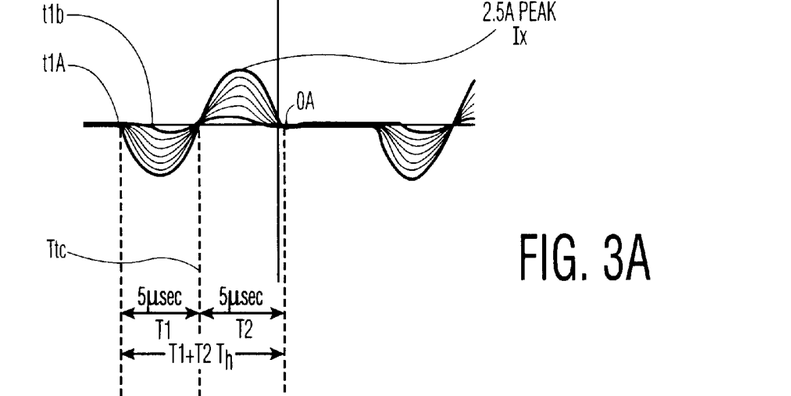
FIGS. 3a, 3b and 3c illustrate waveforms useful for explaining an additional mode of operation of the circuit of FIG. 1.
Figure 3B:
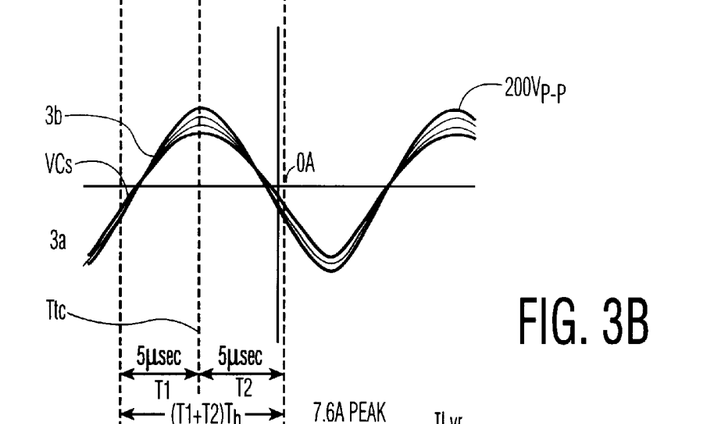
Figure 3C:
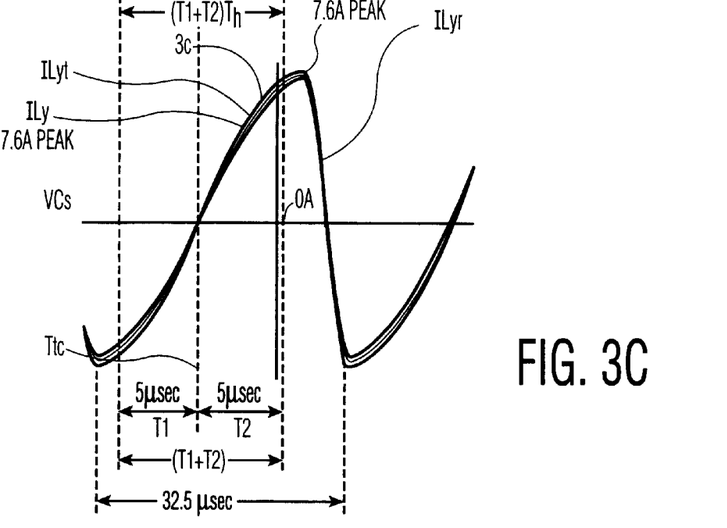

FIGS. 3$a$, 3$b$ and 3$c$ illustrate waveforms useful for explaining the first mode of operation of the circuit of FIG. 1, when current Ix is modulated at a vertical rate. Similar symbols and numerals in FIGS. 1, 3$a$, 3$b$ and 3$c$ indicate similar items or functions. Deflection current ILy of FIG. 3$c$ having a period Th includes a trace portion ILyt and a retrace portion ILyr. Switching transistor Q2 of FIG. 1 is conductive, during an interval T1 of FIG. 3$c$. Interval T1, occurring during trace portion ILyt of FIG. 3$c$, ends at a center time Ttc of trace portion ILyt of FIG. 3$c$. During interval TI, resonant circuit 101 of FIG. 1 is energized by voltage VCs of FIG. 3$a$ in capacitor Cs of FIG. 1 and produces a negative portion of a current Ix of FIG. 3$a$ in circuit 101 of FIG. 1.

An immediately following interval T2 of FIG. 3$a$, occurs symmetrically to interval T1 relative to center time Ttc. During immediately following interval T2 of FIG. 3$a$, a positive portion of current Ix is produced and flows in internal forward conducting reverse diode DQ2 of FIG. 1. Diode DQ2 is included in the same transistor package of transistor Q2. During a sum interval, T1+T2, current Ix of FIG. 3$a$ has an approximately sinusoidal current waveform with a zero-crossing point occurring at center time Ttc, in each horizontal cycle of current ILy of FIG. 3$c$.

Pulse-width modulated signal 60$a$ of FIG. 1 varies a length of interval T1 and interval T2 of current Ix of FIG. 3$a$ at a vertical rate parabolic manner, in accordance with signal IPcor of FIG. 1. Thereby, the total conduction time in transistor Q2 varies at a vertical rate parabolic manner. The result is that each of the amplitude of current Ix and the resonant frequency of vertical rate parabolic manner. Consequently, deflection current ILy is modulated, during sum interval, T1+T2, of FIG. 3$a$. Advantageously, no retrace time modulation and minimal effect on the peak-to-peak amplitude of current ILy occurs, referred to herein as cross-talk. This is so because current Ix is zero during retrace. An advantage of the absence of cross-talk is that independent adjustment of the correction parameters, inside and outside pincushion, is possible.

Figure 6:
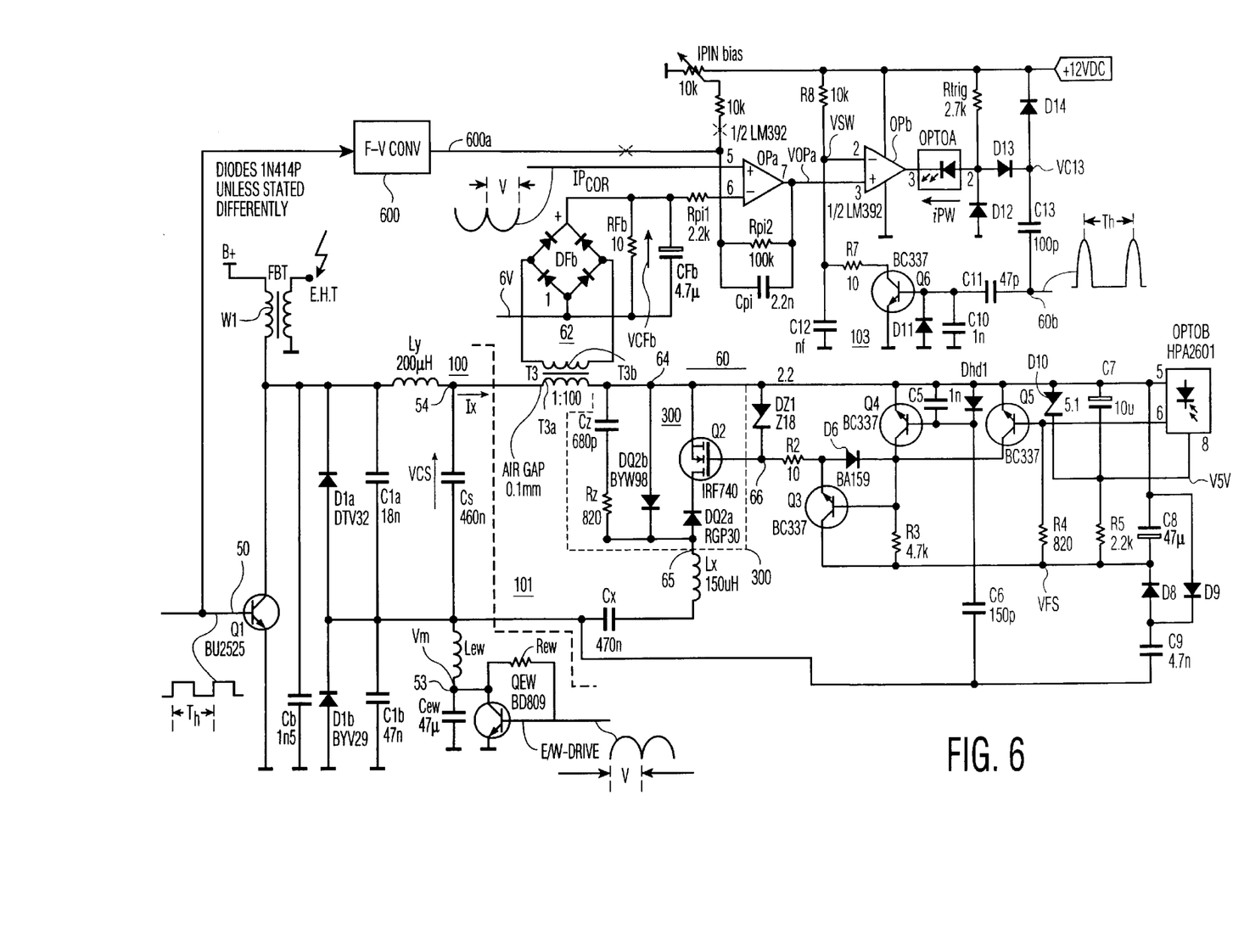

FIG. 6 illustrates a detailed schematic diagram of PWM 60 of FIG. 1. Similar symbols and numerals in FIGS. 6, 1, 3$a$, 3$b$ and 3$c$ indicate similar items or functions. Also, because of a long reverse recovery time of diode DQ2 of FIG. 1, a fast reverse diode DQ2$b$ of FIG. 6 that is external to the package of transistor Q2 is coupled to transistor Q2 for performing the function of diode DQ2 of FIG. 1. A second diode DQ2 of FIG. 6 is coupled in series with transistor Q2. Diode DQ2$a$ eliminates the effect of internal diode DQ2 of FIG. 1. Thus, diode DQ2$b$ of FIG. 6 is coupled in parallel with the series arrangement of diode DQ2$a$ and transistor Q2.

Signal IPcor is a vertical rate, East-West parabola signal synchronized to a vertical synchronization signal, not shown. Horizontal retrace signal 60$b$ is a positive horizontal retrace pulse at about 200 V peak-to-peak derived from a secondary winding of a flyback transformer, not shown, in a conventional manner. A current transformer T3 of current sensor 62 includes a primary winding T3$a$ that conducts current Ix. A secondary winding T3$b$ is coupled to a bridge rectifier DFb. Bridge rectifier DFb is coupled to a filter capacitor CFb for producing a voltage VCFb in capacitor CFb that is proportional to the amplitude of current Ix in circuit 101. Current transformer T3 has a high transformation ratio T3$b$/T3$a$ that is equal to 100. Current transformer T3 transforms the impedance applied via bridge rectifier DFb down to a negligible small value at a primary side T3$a$. Thereby, resonant circuit 101 is, advantageously, unaffected by loading via bridge rectifier DFb.

Voltage VCFb is coupled via a resistor Rpi1 to an inverting input terminal, pin 6, of operational amplifier Opa. A direct current (DC) voltage component at inverting input terminal, pin 6, of operational amplifier Opa is adjusted by a potentiometer resistor IPIN that is coupled to inverting input terminal, pin 6, of operational amplifier Opa. Operational amplifier OPa of PWM 60 provides a feedback compensated control signal VOPa by amplifying a difference between East-West parabola signal IPcor and full wave rectified feedback voltage VCFb. High gain and low pass filtering characteristic of amplifier OPa are established by a parallel arrangement of an integrating capacitor Cpi and a resistor Rpi2 to provide a small closed loop error at stable operation.

A sawtooth generator 103 is formed by a ramp generating resistor R8 coupled to a ramp generating capacitor C12. A switching transistor Q6 is coupled via a collector resistor R7 to capacitor C12 for discharging capacitor C12 each time a retrace pulse of input retrace signal 60b occurs. Signal 60b is coupled to a base of transistor Q6 via a capacitive voltage divider that includes a coupling capacitor C11 and a capacitor C10. Capacitor C10 and a clamping diode D11 are coupled across the base-emitter junction of transistor Q6. Transistor Q6 is forced to a non-conductive state during the second half of horizontal retrace by conductive diode D11. Capacitor C10 prevents ringing in transistor Q6 during the first part of trace due to turn on transients in diodes D1a and D1b that could have, otherwise, triggered transistor Q6 improperly.

Retrace signal 60b produces a horizontal sawtooth voltage VSW at an inverting input terminal of amplifier OPb. As a result, a pulse-width modulated current ipw is generated in a light emitting diode (LED) OPTOA. LED OPTOA has a cathode terminal, pin 3, that is coupled to an open collector output terminal, pin 7, of amplifier OPb.

When the open collector output, terminal 7, of amplifier OPb is at a high impedance state, current ipw in LED OPTOA is zero. As a result, an open collector output, pin 6, of an opto-coupled amplifier OPTOB is at a high impedance state. A pull-up resistor R4 is coupled to open collector output, pin 6, of opto-coupled amplifier OPTOB and to the base of a transistor Q5. Therefore, when LED OPTOA is turned off, transistor Q5 will be turned on. The collector of transistor Q5 is coupled via a diode D6 and a resistor R2 to gate terminal 66 of transistor Q2. When transistor Q5 is turned on, transistor Q5 causes transistor Q2 to turn off. The collector of transistor Q5 is also coupled to a pull-up resistor R3 and to a base of a transistor Q3. The emitter of transistor Q3 is coupled to an anode of diode D6; whereas, a cathode of diode D6 is coupled to the base of transistor Q3 and to a collector of a transistor Q4. On the other hand, when open collector output, terminal 7, of amplifier OPb is at a low impedance state, current ipw flows in LED OPTOA. Therefore, transistor Q5 will be turned off and transistor Q3 will turn on via pull-up resistor R3. Consequently, transistor Q2 will turn on via resistor R2.

In each interval Ti of horizontal period Th of FIG. 3a, transistor Q2 of FIG. 6 is turned on at an instant that varies in a range, t1a to t1b of FIG. 3a, as the position of the electron beam varies in the vertical direction. Symmetrical operation is performed during interval T2. Transistor Q2 of FIG. 6 should be, preferably, turned off before parallel diode DQ2b stops conducting and during the retrace interval.

A supply voltage VFS coupled to resistor R3, to a collector of transistor Q3, to resistor R4 and to opto-coupled amplifier OPTOB is produced in a charge storage capacitor C8. Voltage VFS is referenced to terminal 54 of capacitor Cs. Supply voltage VFS is produced from an alternating current (AC) voltage component of voltage VCS developed in S-capacitor Cs that is capacitively coupled via a capacitor C9 to a rectifier diode D8. Rectifier diode D8 and a rectifier diode D9 act as a half wave rectifier and store the charge in capacitor C8 to develop supply voltage VFS. A zener diode D10, coupled in parallel with a capacitor C7, is coupled via a resistor R5 to voltage VFS for energizing opto-coupler amplifier OPTOB with a 5V supply voltage V5V.

During the second half of trace and the first half of retrace, a protection transistor Q4 is turned on via a capacitive voltage divider formed by a capacitor C6 and a capacitor C5. Therefore, transistor Q5 is decoupled from transistor Q2 and transistor Q2 is maintained turned off.

A diode D12, a diode D13, a diode D14 develop a protection voltage V13 in a capacitor C13. Capacitor C13 is charged during the first half of retrace via diode D14. During the second half of retrace, capacitor C13 is discharged via diodes D12 and D13. As long as diode D12 conducts, current ipw in LED OPTOA is zero. Consequently the output terminal, pin 6, of opto-coupler amplifier OPTOB forms a high impedance and transistor Q5 keeps transistor Q2 turned off.

Adjustment of variable resistor IPIN that is coupled to inverting input terminal, pin 6, of operational amplifier Opa varies the average value of current Ix through inductor Lx and capacitor Cx. Thereby, static or non-modulated linearity correction is obtained. Alternatively, linearity can be adjusted by an output signal 600a of a frequency-to-voltage converter 600. Signal 600a varies as a function of the frequency of horizontal rate signal 50. Frequency-to-voltage converter 600 can be implemented by a digital-to-analog converter output signal controlled by a microprocessor, not shown, that performs a function equivalent to that of variable resistor IPIN. For example, in order to maintain linearity at different selected horizontal deflection frequencies the average value of current Ix through inductor Lx and capacitor Cx can be changed using frequency-to-voltage converter 600. Thereby, a prior art switching arrangement that selects different values for capacitor Cs at different selected horizontal frequencies is, advantageously, avoided.

Figure 2A:
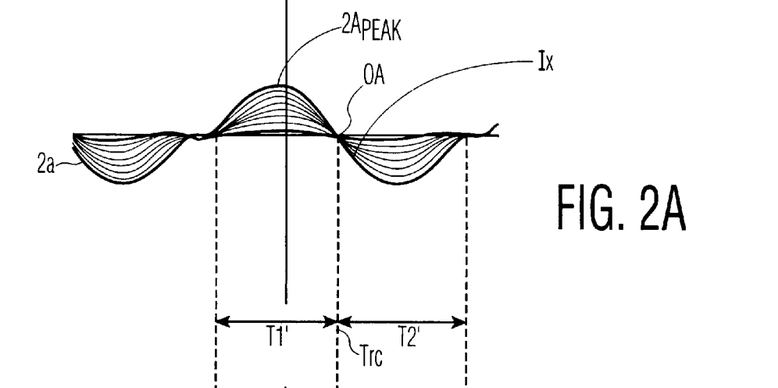
FIGS. 2a, 2b and 2c illustrate waveforms useful for explaining a mode of operation of the circuit of FIG. 1.
Figure 2B:
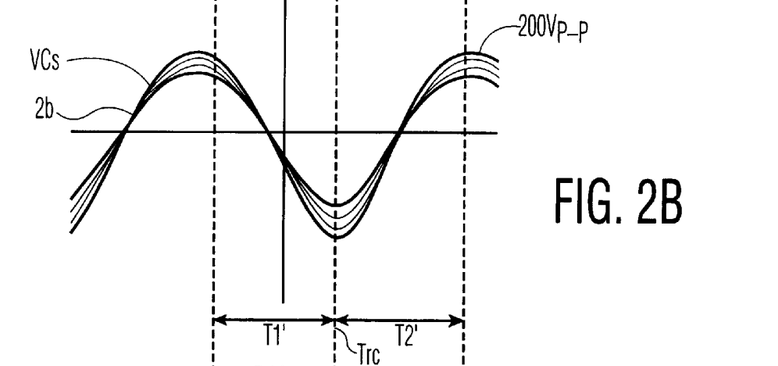
Figure 2C:
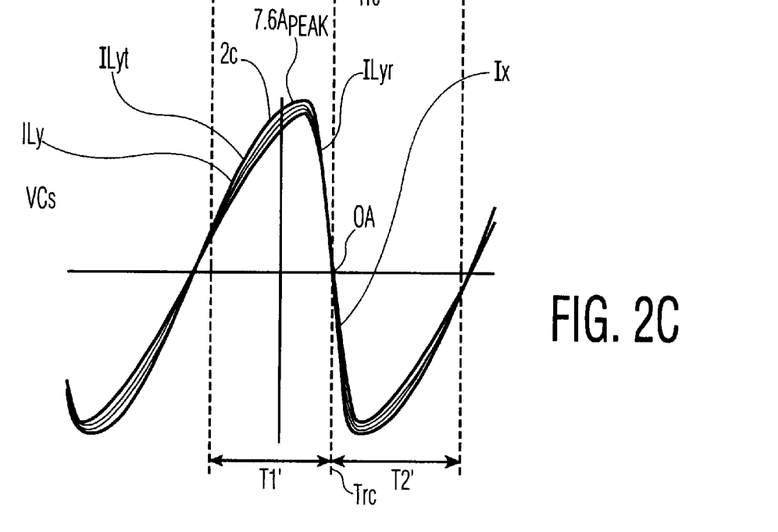
Figure 7:
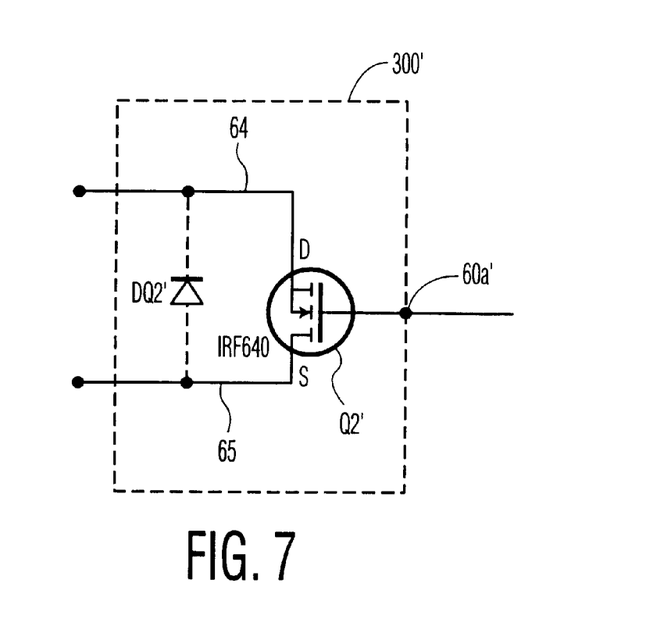
FIG. 7 illustrates an alternative to the switching arrangement of FIG. 1 that is associated with FIGS. 2a, 2b and 2c.

In a second circuit configuration and mode of operation, the selected value of capacitor Cx of FIG. 1 is 470 nF, that of inductor Lx is 300 uH, that of capacitor Cz is 470 pF and that of resistor Rz is 1,500 Ohm. Instead of including switching transistor Q2 in controllable switching arrangement 300 of FIG. 1, a transistor Q2' of FIG. 7 is substituted. Transistors Q2' is an MOS transistor. A source current conducting electrode of transistor Q2' is coupled to terminal 65 of FIG. 1. A drain current conducting electrode of transistor Q2' of FIG. 7 is coupled to terminal 64 of FIG. 1. A gate electrode of transistor Q2' of FIG. 7 is coupled to terminal 66 of FIG. 1. FIGS. 2a, 2b and 2c illustrate waveforms useful for explaining the second mode of operation of the circuit of FIG. 1, having the aforementioned component values associated with the second mode of operation, when current Ix is modulated at a vertical rate. Similar symbols and numerals in FIGS. 7, 1, 2a, 2b, 2c, 3a, 3b and 3c indicate similar items or functions.

Deflection current ILy of FIG. 2c has a trace portion ILyt and a retrace portion ILyr. Switching transistor Q2' of FIG. 7 is conductive, during an interval T1' of FIG. 2a. Interval T1' begins during trace portion ILyt of FIG. 2c and ends at a center time Trc of retrace portion ILyr of FIG. 2c.

During interval T1' of FIG. 2a, resonant circuit 101 of FIG. 1 is energized by voltage VCs in capacitor Cs and produces a positive portion of a current Ix of FIG. 2a in circuit 101 of FIG. 1. During a following interval T2' of FIG. 2a, that occurs symmetrically to interval T1' relative to center time Trc, a negative portion of current Ix of FIG. 2a is produced via an internal reverse diode DQ2' that is included in the same package of transistor Q2'. Current Ix of FIG. 2a is an approximately sinusoidal current waveform with a zero-crossing point occurring at center time Trc, in each cycle of current ILy of FIG. 2c.

Signal 60a of FIG. 1 varies a length of interval T1' of FIG. 2a at a vertical rate parabolic manner, in accordance with signal IPcor of FIG. 1. Thereby, the total conduction time of transistor Q2' varies at a vertical rate in a parabolic manner. The result is that an amplitude of current Ix and the resonant frequency of circuit 101 of FIG. 1 vary at a vertical rate parabolic manner. Consequently, deflection current ILy is modulated, during a combined interval, T1'+T2', of FIG. 2c.

Any cross talk effect of outside pincusion distortion correction signal E/W-drive, which can cause an undesirable retrace time variation, is determined by a magnitude of current Ix of FIG. 2a, during retrace. The magnitude of current Ix is low, during retrace. Therefore, advantageously, outside pincushion cross talk does not exceed a small value.

In a third circuit configuration and mode of operation, the selected value of capacitor Cx of FIG. 1 is 470 nF, that of inductor Lx is 130 uH, that of capacitor Cz is 680 pF and that of resistor Rz is 820 Ohm. Instead of including switching transistor Q2 in controllable switching arrangement 300 of FIG. 1, an MOS transistor Q2a and an MOS transistor Q2b of FIG. 4 that are coupled in series are substituted. A drain current conducting electrode of transistor Q2a is coupled to a drain current conducting electrode of transistor Q2b via a junction terminal 67. A source current conducting electrode of transistor Q2a is coupled to terminal 64 of FIG. 1. A source current conducting electrode of transistor Q2b of FIG. 4, instead of drain current conducting electrode of transistor Q2 of FIG. 1, is coupled to terminal 65. A gate electrode of each of transistors Q2a and Q2b of FIG. 4 is coupled to terminal 66 of FIG. 1.

Figure 5A:
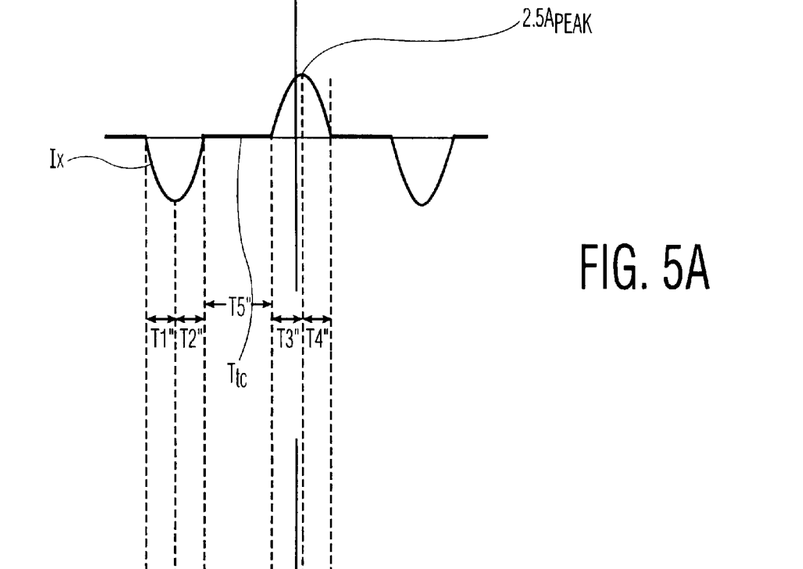
FIGS. 5a, 5b and 5c illustrate waveforms useful for explaining a further mode of operation of the circuit of FIG. 1 having the alternative switching arrangement of FIG. 6 illustrates a detailed schematic diagram of the circuit of FIG. 1.
Figure 5B:
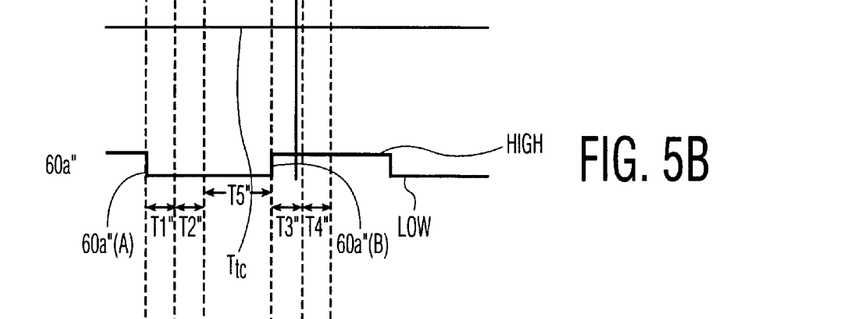
Figure 5C:
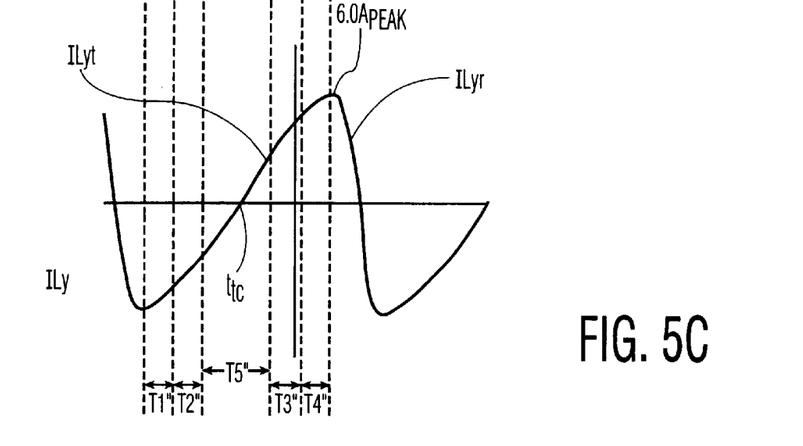

FIGS. 5a, 5b and 5c illustrate waveforms useful for explaining the third mode of operation of the circuit 100 of FIG. 1, having the aforementioned component values associated with the third mode of operation, for an example in which current Ix is modulated at a constant rate. Similar symbols and numerals in FIGS. 1, 2a, 2b, 2c, 3a, 3b, 3c, 4, 5a, 5b and 5c indicate similar items or functions.

Figure 4:
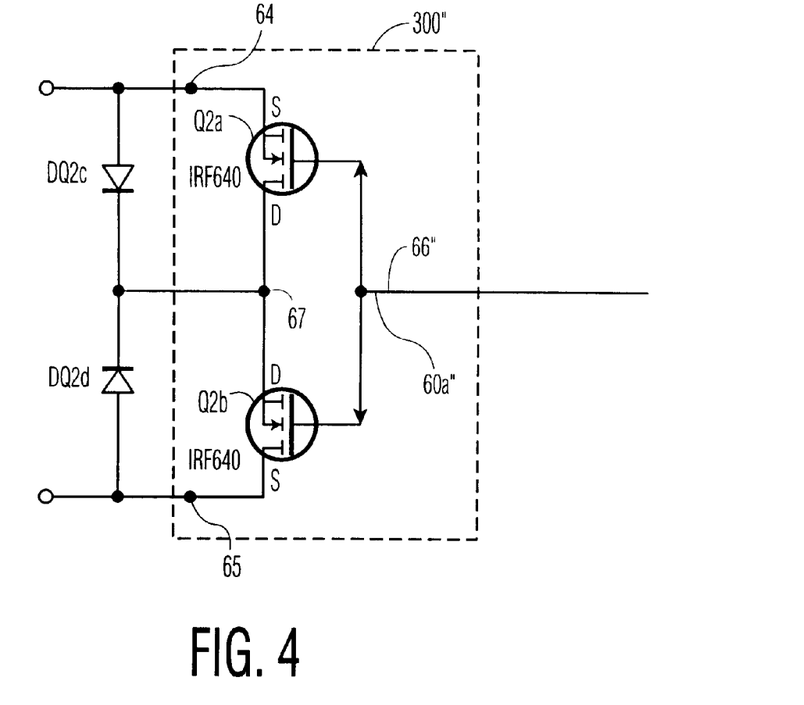
FIG. 4 illustrates an alternative to a switching arrangement of FIG. 1.

In the third mode of operation, switching transistor Q2a and a forward biased built-in diode DQ2d of transistor Q2b of FIG. 4 are coupled in series and conduct, during an interval T1" and an immediately following interval T2" of FIG. 5a. Interval T1" and immediately following interval T2" occur during trace portion ILy of FIG. 5c. Interval T2" ends prior to center time Ttc of trace portion ILy of FIG. 5c. Switching transistor Q2b and a forward biased built-in diode DQ2c of transistor Q2a of FIG. 4 are coupled in series and conduct, during an interval T3" and an immediately following interval T4" of FIG. 5a. Interval T3" and immediately following interval T4" also occur during trace portion ILy of FIG. 5c. Interval T3" begins following center time Ttc of trace portion ILy of FIG. 5c such that neither transistor Q2a of FIG. 4 nor transistor Q2b conducts during an interval T5" that occurs between intervals T2" and T3". Interval T4" ends prior to an end of trace portion ILyt of FIG. 5c.

During intervals T1" and T2" of FIG. 5a, resonant circuit 101 of FIG. 1 is energized by voltage VCs in capacitor Cs. Consequently, a negative portion of current Ix of FIG. 5a in circuit 101 of FIG. 1 is produced. The negative portion of current Ix varies, during intervals T1" and T2" of FIG. 5a, in a manner a sinusoidal waveform varies between 180 and 360 degrees. Similarly, during intervals T3" and T4" of FIG. 5a, that occur symmetrically to intervals T1" and T2", respectively, relative to center time Ttc, a positive portion of current Ix of FIG. 5a is produced. The positive portion of current Ix varies, during intervals T3" and T4" of FIG. 5a, in the manner a sinusoidal waveform varies between 0 and 180 degrees. During an interval T5", that occurs symmetrically relative to center time Ttc, both transistors Q2a and Q2b of FIG. 4 are turned off and current Ix of FIG. 5c is zero.

The waveform of a drive signal 60a" is shown in FIG. 5b. Transistor Q2a of FIG. 4 is forward conducted, when signal 60a" of FIG. 5b is at a LOW state. Whereas, transistor Q2b of FIG. 4 is forward conducted, when signal 60a" of FIG. 5b is at a HIGH state. This drive method produces minimal outside pincushion cross talk and no retrace time modulation, since current Ix of FIG. 5a is zero during the retrace interval.

For obtaining vertical rate modulation of current Ix of FIG. 1, a symmetrical circuit control, not shown, is required to provide modulated correction, not shown in FIGS. 5a, 5b and 5c. Modulation correction would require phase shifting of a transition edge 60a" (A) of drive signal 60a" of FIG. 5b by a variable amount at a vertical rate. Also, phase shifting of a transition edge 60a" (B) of drive signal 60a" should be done by the same variable amount but in opposite direction and symmetrically relative to center time Ttc.

The first, second and third modes of operation can be implemented separately or combined depending on the spatial geometry error distribution on the screen of the CRT. The first mode of operation provides the highest S-shape modulation at the center of horizontal trace. The second mode of operation provides the highest S-shape modulation at the borders of horizontal trace. The third mode of operation provides the highest S-shape modulation at the first quarter and at the third quarter of horizontal trace. Because each mode of operation can employ modulation in the vertical direction of the screen of the CRT, these modes of operations provide various solutions for CRT applications.

What is claimed is:

1. A deflection apparatus with raster distortion correction, comprising:

a deflection winding coupled to a retrace capacitance to form a retrace resonant circuit during a retrace interval, and coupled to a trace capacitor to form a first trace resonant circuit that includes said deflection winding and said trace capacitor during a trace interval;

a first switching semiconductor responsive to a synchronizing first signal at a frequency related to a first deflection frequency and coupled to said deflection winding for generating a deflection current in said deflection winding synchronized to said synchronizing signal;

a modulation inductance that is coupled in a second trace resonant circuit during said trace interval;

a source of a modulation second signal at a frequency related to a second deflection frequency; and, a second switching semiconductor responsive to said first and second signals, having a first switching state during a first portion of said trace interval and a second switching state during a second portion of said trace interval, said first and second portions varying in accordance with said second signal, said second switching semiconductor being coupled to said modulation inductance for producing in said modulation inductance and in said trace capacitor a modulation current that modulates a voltage developed in said trace capacitor in accordance with said second signal for providing the raster distortion correction.

2. A deflection apparatus with raster distortion correction according to claim 1, wherein said trace capacitor voltage is modulated to provide for S-shaping correction.

3. A deflection apparatus with raster distortion correction according to claim 1, further comprising a pulse-width modulator responsive to said synchronizing first signal and said modulation second signal for controlling said switching states of said second switching semiconductor.

4. A deflection apparatus with raster distortion correction according to claim 1, further comprising a modulation capacitance coupled to said trace capacitor and to said modulation inductance to form said second trace resonant circuit during said second portion of said trace interval.

5. A deflection apparatus with raster distortion correction according to claim 1, further comprising an East-West raster distortion correction circuit responsive to a modulation third signal at a frequency related to a vertical deflection frequency, for providing East-West raster distortion correction.

6. A deflection apparatus with raster distortion correction according to claim 5, wherein said East-West raster distortion correction circuit comprises a diode modulator.

7. A deflection apparatus with raster distortion correction according to claim 1, further comprising a switch controller responsive to said modulation second signal and to a feedback signal for controlling said second switching semiconductor in a negative feedback closed loop.

8. A deflection apparatus with raster distortion correction according to claim 7, wherein said feedback signal is generated in a current sensor.

9. A deflection apparatus with raster distortion correction according to claim 1, wherein said second switching semiconductor couples said modulation inductance to said trace capacitor during said second portion of said trace interval and decouples said modulation inductance from said trace capacitor during said first portion of said trace interval.

10. A deflection apparatus with raster distortion correction according to claim 9, wherein said second portion of said trace interval is disposed symmetrically with respect to a center of said trace interval.

11. A deflection apparatus with raster distortion correction according to claim 9, wherein said second portion of said trace interval is disposed in a non-contiguous manner, during each trace interval.

12. A deflection apparatus with raster distortion correction according to claim 9, wherein said second portion of said trace interval is disposed symmetrically with respect to a center of said retrace interval.

13. A deflection apparatus with raster distortion correction according to claim 1, wherein said first switching semiconductor comprises a first switching transistor and wherein said second switching semiconductor comprises a second switching transistor.

14. A deflection apparatus with raster distortion correction, comprising:

a deflection winding coupled to a retrace capacitance to form a retrace resonant circuit during a retrace interval;

a first switching semiconductor responsive to a synchronizing first signal at a frequency related to a first deflection frequency and coupled to said deflection winding for generating a deflection current in said deflection winding synchronized to said synchronizing signal;

an impedance; and, a second switching semiconductor responsive to said first signal and having a first switching state during a first portion of a trace interval and a second switching state during a second portion of said trace interval, said second switching semiconductor being coupled to said impedance and said deflection winding for producing a modulation current in said impedance during said second portion of said trace interval;

a source of a modulation second signal at a frequency related to a second deflection frequency; and, a modulator responsive to said modulation second signal and to a feedback signal that is indicative of said modulation current and coupled to said second switching semiconductor for controlling said second switching semiconductor in a negative feedback closed loop.

15. A deflection apparatus with raster distortion correction according to claim 14, wherein said impedance comprises a modulation inductance that is coupled to an S-shaping capacitor to form a resonant circuit for providing modulated S-correction.

* * * * *